United States Patent [19]

Schuhmacher

[11] Patent Number: 5,073,702
[45] Date of Patent: Dec. 17, 1991

[54] MULTIPLE BEAM BAR CODE SCANNER

[75] Inventor: Chris A. Schuhmacher, San Antonio, Tex.

[73] Assignee: NCR Corporation, Dayton, Ohio

[21] Appl. No.: 498,887

[22] Filed: Mar. 26, 1990

[51] Int. Cl.$^5$ .............................................. G06K 7/10
[52] U.S. Cl. .................................. 235/467; 235/470; 359/205; 359/204
[58] Field of Search ................. 235/467, 470; 372/24; 350/3.81, 6.7

[56] References Cited

U.S. PATENT DOCUMENTS

| | | | |
|---|---|---|---|
| 3,524,706 | 8/1970 | Farr | 356/71 |
| 3,588,227 | 6/1971 | Yamamoto | 350/194 |
| 3,664,751 | 5/1972 | Haas | 356/219 |
| 3,708,797 | 1/1973 | Solomon et al. | 346/108 |
| 3,818,444 | 6/1974 | Connell | 340/146.3 F |
| 3,928,759 | 12/1975 | Sansone | 250/568 |
| 4,167,024 | 9/1979 | Hamisch | 358/128 |
| 4,224,509 | 9/1980 | Cheng | 235/457 |
| 4,312,559 | 1/1982 | Kojima et al. | 350/3.72 |
| 4,333,906 | 6/1982 | Gorin et al. | 235/457 |
| 4,357,071 | 11/1982 | Mankel et al. | |
| 4,560,862 | 12/1985 | Eastman et al. | 235/467 |
| 4,566,765 | 1/1986 | Miyauchi et al. | 350/619 |
| 4,794,237 | 12/1988 | Ferrante | 235/467 X |
| 4,797,551 | 1/1989 | Ferrante | 235/467 X |
| 4,999,482 | 3/1991 | Yang | 235/467 X |

FOREIGN PATENT DOCUMENTS 0152733  8/1985  European Pat. Off. .
0206454 12/1986  European Pat. Off. .

Primary Examiner—David Trafton
Attorney, Agent, or Firm—Richard W. Lavin

[57] ABSTRACT

A bar code scanner includes a source of a scanning light beam which is intercepted by a beam splitter which divides the laser beam into two secondary light beams. Each secondary light beam is projected through a focusing lens which focuses each beam at a different focal point. Both of the secondary light beams are directed at a second beam splitter which combines the two secondary light beams forming a primary scanning light beam which is directed at a scanning area adjacent the scanner which will scan a coded bar code label at various distances from the scanner in accordance with the location of the two focal points.

11 Claims, 4 Drawing Sheets

MULTIPLE BEAM BAR CODE SCANNER

BACKGROUND OF THE INVENTION

The present invention relates to optical scanning systems and more particularly to an optical bar code scanning system which can be mounted in or on a check-out counter for scanning bar code labels on an article which is moved past a scanning aperture located in the bar code scanner.

In present-day merchandising point-of-sale operations, data pertaining to the purchase of a merchandise item is obtained by reading data encoded indicia such as a bar code printed on the merchandise item. In order to standardize the bar codes used in various point-of-sale checkout systems, the grocery industry has adopted a uniform product code (UPC) which is in the form of a bar code. Various reading systems have been constructed to read this bar code, including hand-held wands which are moved across the bar code and stationary optical reader systems normally located within the checkout counter in which the bar code is read by projecting a plurality of scanning light beams at a window constituting the scanning area of the counter over which a purchased merchandise item supporting a bar code label is moved. This scanning operation is normally part of the process of loading the item into a baggage cart. In prior scanning systems, the projected scanning beams are all focused in a single plane through which the bar code label is moved. Since many merchandise items support the bar code label at various angles and distances to the focal plane of the scanning light beams, complex and expensive optical reflecting systems have been developed to transmit these scanning beams at different angles to cover all possible orientations of the bar code label to ensure a valid scan operation. This requirement limits the operating efficiency of such scanning systems, while increasing their cost.

SUMMARY OF THE INVENTION

There is provided, in accordance with the present invention, an optical scanning unit which includes a laser whose output light beam is deflected along a first path in which is located a beam splitter which divides the laser beam into two different secondary light beams. One of the secondary light beams propagates ahead to a focusing lens that creates a scanning light beam capable of reading bar code labels at a first predetermined distance from the scanning unit. The second secondary light beam is deflected by mirrors and passes through a second focusing lens which focuses the scanning light beam to read a bar code label at a second predetermined distance from the scanning unit. The second secondary light beam is deflected by a second mirror and intercepts the first secondary light beam at a second beam splitter which combines the two secondary scanning light beams. At this point the two secondary light beams are superimposed on one another creating a primary scanning light beam that is directed at a mirror assembly within the scanning unit which deflects the scanning light beams towards an aperture in one of the walls of the scanning unit forming a scanning pattern at both predetermined distances from the scanning unit for reading bar code labels located at both distances.

It is therefore a principal object of this invention to provide an optical scanner which generates a scanning light beam comprised of two secondary light beams each focusing on a different focal plane with respect to the optical scanner.

It is a further object of this invention to provide a multiple focusing scanning system which is simple in construction and therefore low in cost.

BRIEF DESCRIPTION OF THE DRAWINGS

These and other objects, features and advantages of the invention, as well as the invention itself, will become more apparent to those skilled in the art in light of the following detailed description taken into consideration with the accompanying drawings wherein like reference numerals indicate like or corresponding parts throughout the several views and wherein.

DESCRIPTION OF THE PREFERRED EMBODIMENT

Figure 1:
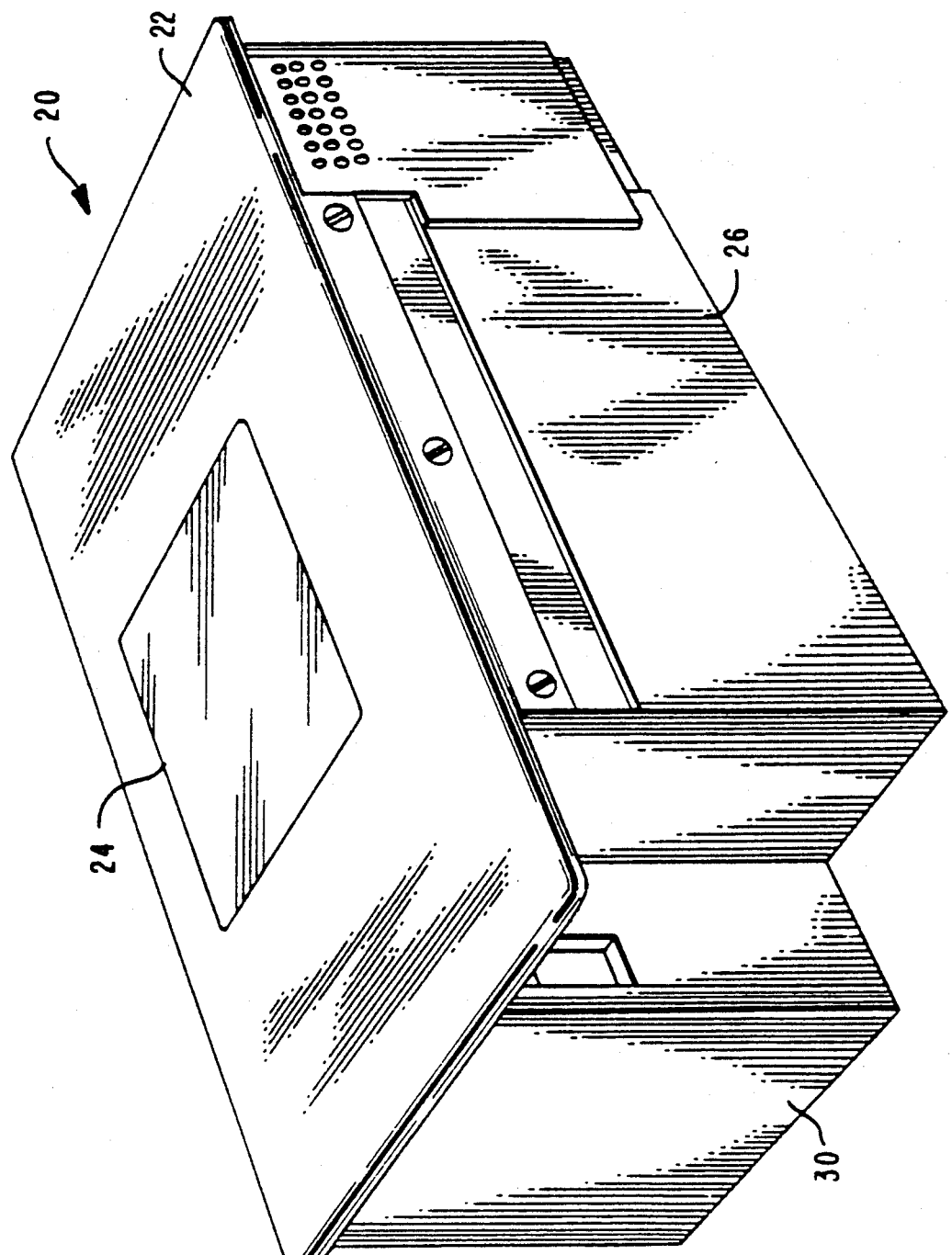
FIG. 1 is a perspective view of the optical scanner in which the present invention is incorporated.

Referring now to FIG. 1 there is shown a perspective view of an optical scanner in which the present invention may be incorporated. The optical scanner is fully disclosed in the U.S. Pat. No. 4,851.667 which is assigned to the assignee of the present invention. The scanner comprises a box-like structure generally indicated by the numeral 20 and which includes a cover portion 22 having centrally located therein a glass covered aperture 24. While the present invention is disclosed as being incorporated into a portable optical scanner, it is obvious that the invention can be utilized in scanners which are mounted within a checkout counter or in a hand-held scanner for scanning bar code labels. The structure 20 includes a pair of side wall portions 26 and 28 (FIG. 2) and front and rear wall portions 30 and 32 (FIG. 2) having a maximum depth of 13 centimeters. The structure 20 is normally mounted within a checkout counter (not shown) whose supporting surface is coplanar with the top surface of the cover portion 22 enabling a purchased merchandise item having a UPC coded label attached thereto to be moved past the aperture 24 as part of a checkout operation.

Figure 2:
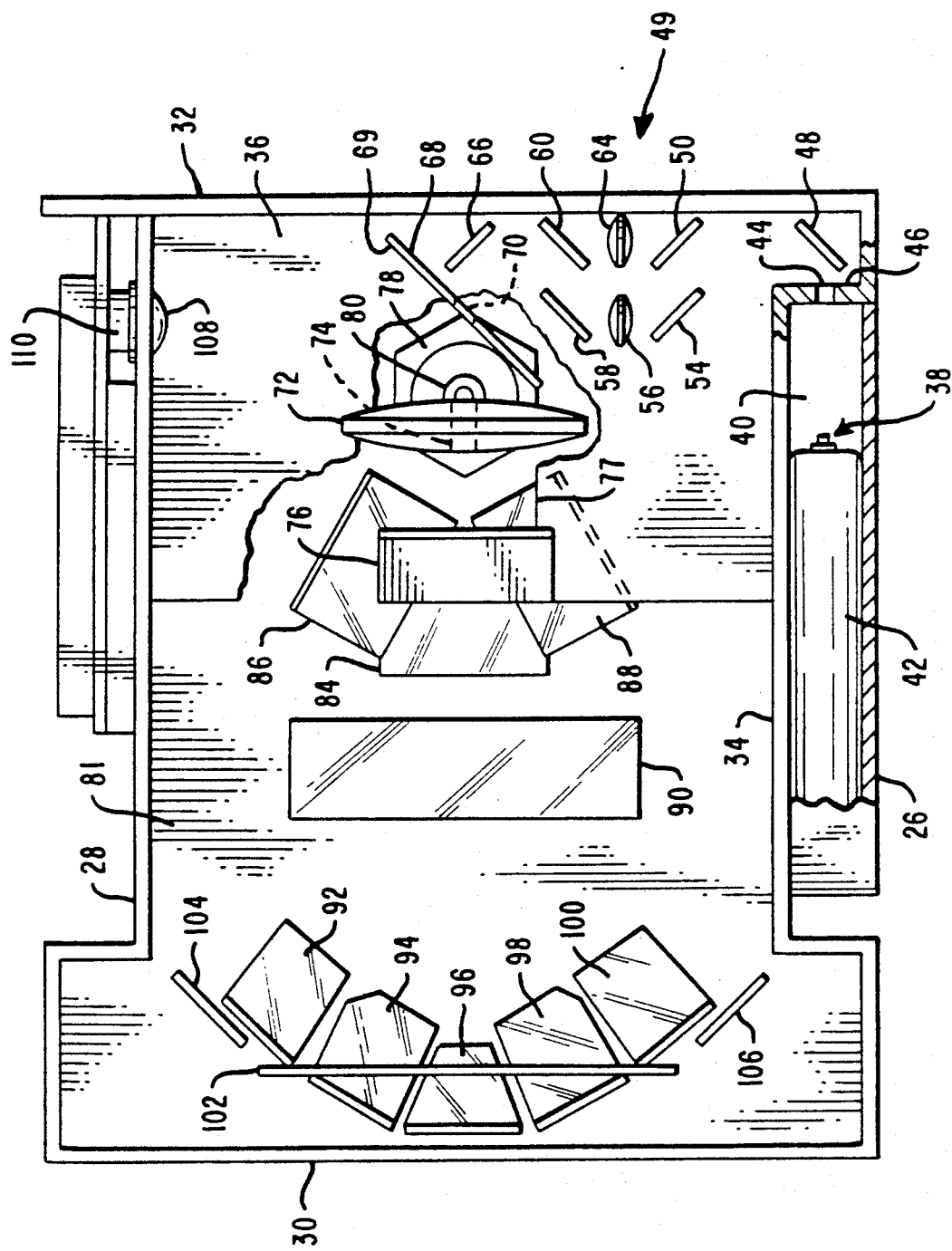
FIG. 2 is a top view of the optical scanner with the cover and a portion of the shelf removed showing the location of the lens system for producing the secondary scanning light beams.

Referring now to FIG. 2 there are shown structural details of the optical scanner. Extending between the side wall portion 28 and an inner side wall portion 34 of the structure 20 is a shelf member 36. The inner side wall portion 34 and the side wall portion 26 form a compartment generally indicated by the numeral 38 in which is located a Helium Neon laser member 42 secured to the side wall portion 34 which projects a coherent light beam 43 (FIG. 3) through an aperture 44 located in a rear wall portion 46 of the compartment 38. Positioned adjacent the aperture 44 and mounted on the shelf member 36 is a routing mirror 48 positioned at a 45° angle to the center line of the aperture 44.

Mounted on the shelf member 36 adjacent the routing mirror 48 and the rear wall portion 32 is a beam processing system generally indicated by the numeral 49 and which includes beam splitter members 50 and 60, routing mirrors 54 and 58 and focusing lens members 56 and 64. As will be described more fully hereinafter, the beam processing system 49 will split the light beam 43 outputted by the laser member 42 into two secondary beams 52, 62 (FIG. 3) which are focused at different predetermined distances by the focusing lens 56 and 64 after which the beams are combined to form a single scanning light beam 65.

Mounted on the shelf member 36 adjacent the beam processing system 49 is a second routing mirror 66 positioned at a 45° angle to the rear wall portion 32. Mounted on the shelf member 36 adjacent the routing mirror 66 and extending in a direction perpendicular to the orientation of the routing mirror 66 is a transparent collection mirror 68 which includes an aperture 70 extending through the mirror 68. The mirror 68 has one side 69 constructed to reflect light beams impinging thereon in a manner that is well known in the art. Mounted on the shelf member 36 and located adjacent the collection mirror 66 is a convex lens member 72 which includes an aperture 74 extending through the lens member 72. The lens member 72 is constructed to focus the light beams reflected from a scanned UPC coded label onto a photodetector 110.

Figure 3:
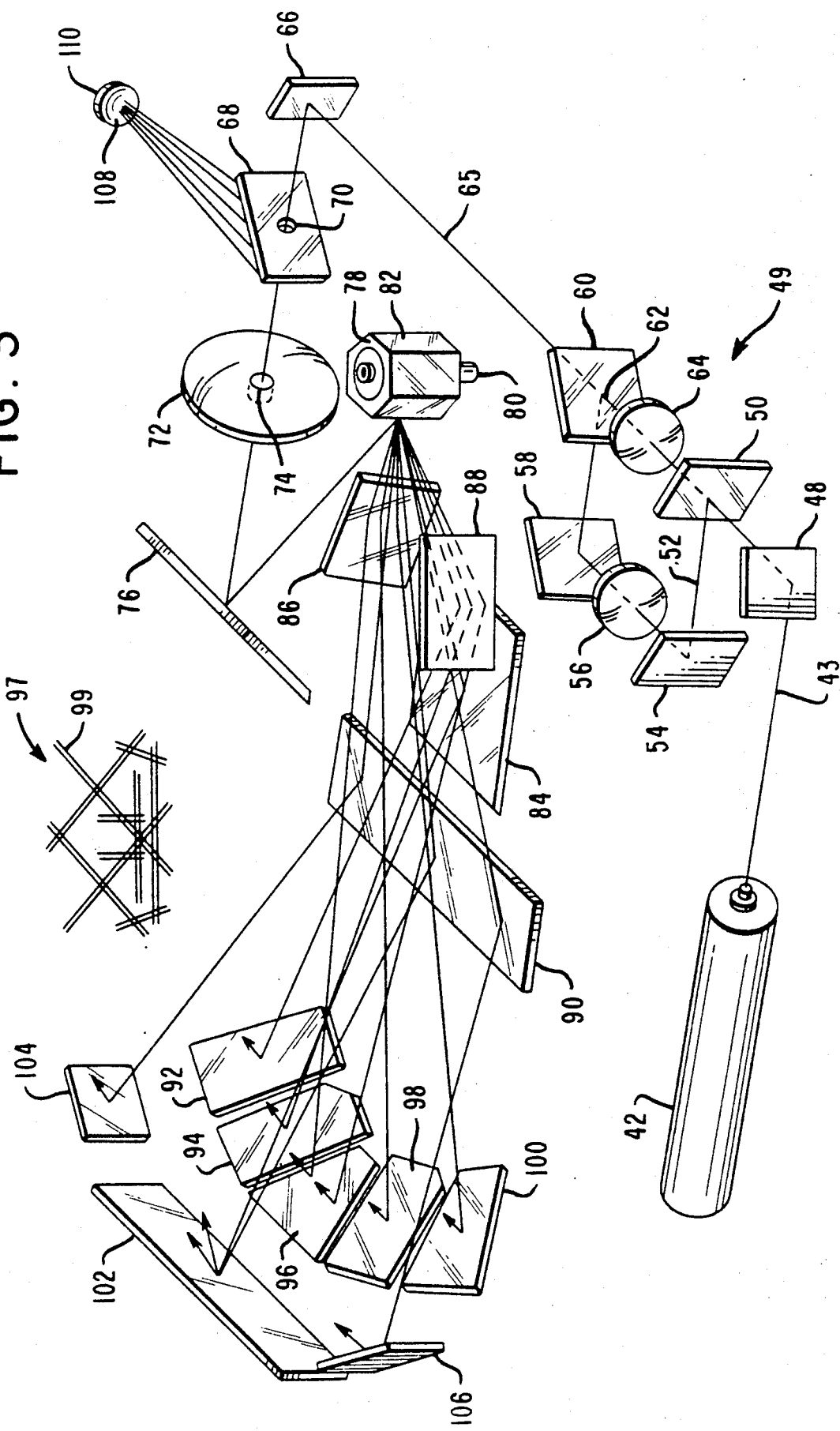
FIG. 3 is a perspective view of the optical geometry of the optical scanner in which the present invention is incorporated.

Mounted at an angle of 65° to the shelf member 36 is a routing mirror 76 (FIGS. 2 and 3). As will be described more fully hereinafter, the routing mirrors 48 and 66 will direct the output light beam of the laser member 42 through the aperture 70 in the collection mirror 68 and the aperture 74 in the convex lens member 72 to the routing mirror 76 which deflects the light beam in downward direction through the recessed portion 77 in the shelf member 36 to a position beneath the shelf member 36 and the bifocal lens member 72. The deflected light beam impinges on a multifaceted mirrored spinner generally indicated by the numeral 78. The spinner 78 is rotatably mounted on a drive motor 80 (FIG. 3) secured to the lower surface of the shelf member 36 for rotating the spinner 78 at a predetermined speed, for example, 6144 revolutions per minute. Secured to the spinner 78 are six mirror elements 82 (FIG. 3) in which opposite sided mirrors are mounted at various angles to the vertical face of the spinner in order to generate a multiple line scanning pattern as will be described more fully hereinafter. Two of the mirrors are pitched backward by 8° to a vertical plane. One of the remaining two sets of mirror 82 are pitched forward by 3°, while the remaining set of two mirrors are pitched backward by 3°.

Mounted at an angle to the floor portion 81 of the structure 20 is a center lower pattern mirror 84 while secured to brackets (not shown) mounted on the floor portion 81 are a right lower pattern mirror 86 and a left lower pattern mirror 88. Mounted at a slight angle to the floor portion 81 is a center upright pattern mirror 90. Located adjacent the front wall portion 30 of the structure 20 and mounted at an angle of 72: to the floor portion 81 are a right end lower pattern mirror 92 and a left end lower pattern mirror 100. Mounted at an angle of 71° to the floor portion 81 is a right middle lower pattern mirror 94 and a left middle lower pattern mirror 98. Mounted at an angle of 65° to the floor portion 81 is a center pattern mirror 96. Mounted to the front wall portion 30 in a direction off-set to a vertical plane by 3° are a center top pattern mirror 102, a right top pattern mirror 106 orientated 49° to the mirror 102 and a left top pattern mirror 104 orientated 49° to the mirror 102. As best shown in FIG. 3, the mirrors 92-100 inclusive are orientated at an angle with respect to the floor portion 81. These mirrors act together with the mirrors 102-106 inclusive to direct the scanning light beams received from the pattern mirrors 84-90 inclusive through the aperture 24 (FIG. 1) to form a scanning pattern generally indicated by the numeral 97 (FIG. 3) which consist of three sets of scan lines 99 for scanning the UPC label positioned adjacent the aperture 24. Each set of scan lines is generated by a facet 82 (FIGS. 2 and 3) orientated at 8° to a vertical plane and one of the facets 82 orientated either plus or minus 3°.

Located in the side wall portion 28 (FIG. 2) of the enclosure structure 20 is a colored meniscus lens member 108 (FIGS. 2 and 3) in which is positioned the photodetector 110 for converting the light beams received from the lens member 108 into electrical signals which are processed by the scanner electronics in a manner that is well known in the art. The color of the lens member 108 is chosen to filter out wavelengths of the light beams reflected from the UPC label which are less than that of the laser light beam, such as the blue and green light bands, resulting in the transmission of light beams to the photodetector 110 having a band pass centered on the wavelength of the laser light beam. The collection mirror 68 is a spectrally selective "cold" mirror which reflects light beams having a wavelength equal to or less than that of the laser light beam outputted by the laser member 42. Side 69 of the mirror 68 is painted with a light absorbing material such as black aluminum which absorbs light having a wavelength greater than that of the laser light beam, such as the infrared band, while reflecting the remaining bands of the reflected light beams.

Referring again to FIG. 3, there is shown a perspective view of the optical elements found in the enclosed structure 20 for directing the light beam 43 of the laser member 42 in a direction to generate the scanning pattern 97. The laser light beam 43 outputted from the laser 42 is deflected by the routing mirror 48 towards the beam splitter member 50 which splits the beam into a first secondary light beam 52 and a second secondary light beam 62. The secondary light beam 52 is directed at the routing mirror 54 which reflects the light beam at the focusing lens 56 which in turn focuses the light beam at a plane (not shown) located at a first predetermined distance from the aperture 24 (FIG. 1). The light beam 52 emanating from the focusing lens member 56 is deflected off the routing mirror 58 towards the second beam splitter member 60 which combines the light beams 52 and 62 producing the scanning light beam 65 which in turn is directed towards the routing mirror 66. It will be seen that the scanning light beam 65 is composed of two scanning light beams 52 and 62 which will be focused at different focal planes located adjacent the aperture 24. As a bar code label is moved through one of the focal planes adjacent the aperture 24, the bar code label will modulate only the secondary beam that is focused on that plane. The other secondary beam has a diameter too large to be modulated by the bar code label and therefore does not provide a signal. This process is repeated as the bar code label is located at different planes adjacent the aperture 24. It should be noted that the scanning light beam 65 may be comprised of secondary beams originating from the same source or from many different sources. This arrangement can be repeated for multiple beams superimposed on each other.

Referring again to FIG. 3, the scanning light beam 65 reflected by the routing mirror 66 is directed through the aperture 70 in the collection mirror 68 and through the aperture 74 of the convex lens member 72 to the mirror 76 which reflects the light beam towards the rotating mirrored spinner 78. The light beam 65, upon striking the various facets 82 of the spinner 78, will be deflected to the pattern mirrors 84-90 inclusive. The mirrors 84-90 inclusive will reflect the received light beams towards the mirrors 92-106 inclusive which in turn deflect the light beams through the aperture 24 (FIG. 1) in the cover portion 22 of the structure 20. The scanning pattern 97 that is generated by this mirror system comprises sets of scan lines 99 which cross, as shown in FIG. 3, to provide a highly efficient scanning pattern capable of reading a bar code label orientated up to 90° to the cover portion 22.

After striking the UPC label, the diverging reflected light beams are retrodirected through the aperture 24 to the pattern mirrors 84-106 inclusive and to the spinner 78 which direct the reflective light beams towards the routing mirror 76 from where the light beams are directed to the convex lens member 72. The lens member 72 will focus the received light beams at the photodetector 110 by directing the reflected light beams towards the collection mirror 68 which reflects the received light beams towards the lens member 108 from where the photodetector 110 will generate electrical signals for use in processing the data incorporated in the bar code label. Since the reflected light beams may contain sunlight, the mirror 68 and the lens member 108 will filter out all wavelengths of light except that of the laser light beam thus ensuring that the light beams received by the photodetector 110 will enable the photodetector to generate electrical signals which accurately represent the data contained in the bar code label.

Figure 4:
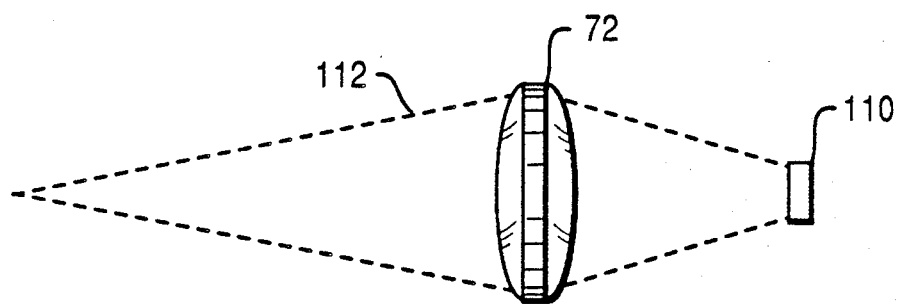
FIG. 4 is a diagram illustrating the detection of the secondary scanning beam focused at the farthest focal plane.
Figure 5:
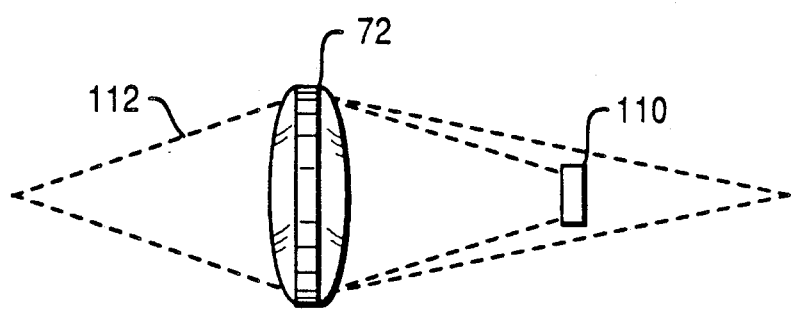
FIG. 5 is a diagram illustrating the detection of the secondary scanning beam focused at the closest focal plane.

As shown in FIG. 4, the light beams 112 reflected from a bar code label positioned in the farthest focal plane will be focused by the lens member 72 completely on the photodetector 110 while the light beams reflected from a bar code label positioned in the nearest focal plane (FIG. 5) will overfill the photodetector thus limiting the amount of reflected light beams that is impinging on the photodetector. This arrangement provides an automatic dynamic range control of the light energy transmitted to the photodetector as the distance between the bar code label and the scanning unit is varied. It will be seen that the scanning light beam 65 which generates the scanning lines 99 comprising the scanning pattern 97 will contain a plurality of scanning light beams each of which is focused at a different focal point to read a bar code label enabling the scanner to scan bar code labels which are moved through different focal planes adjacent the aperture 24 of the scanner. This construction enables the scanner to provide a higher rate of valid read operations of the bar code label.

It should be noted that the scanning or multiple light beams can be generated from either different sources or the same source. The source can be either a laser or any other type of light that can be collimated and conditioned, such as a Visible Laser Diode or a high powered LED. If a problem exist with the bias level of the modulated signal, a light chopper (not shown) could be added to the system. The light shopper would only allow one of the two beams to scan while the remaining light beam would be blocked. After a small interval, the remaining light beam would be the scanning light beam while the first light beam would be blocked. In space it would appear as though a focused spot were moving along a single beam. Contrast this to the present invention where a plurality of scanning light beams exit at the same time each with different focuses in space. Either application would achieve the same result.

Although the preferred embodiment of the present invention has been described herein, it is not intended that the invention be restricted thereto but that it be limited only by the true spirit and scope of the appended claims.

What is claimed is:

1. An apparatus for projecting scanning light beams in a direction for scanning a coded symbol on an object comprising:
    means for projecting a scanning light beam along a first path;
    means mounted in said first path for splitting the scanning light beam into first and second light beams;
    focusing means intercepting said first and second light beam for focusing said first and second light beams at a different focal point through which the coded symbol may pass;
    first deflecting means intercepting said first focused light beam for deflecting said first light beam to a point where both of said first and second focused light beams intersect;
    means mounted at said intersecting point to combine said focused light beams to form a single scanning light beam; and
    second deflecting means intercepting said single scanning light beam for deflecting the single light beam in a scanning direction for scanning a coded symbol positioned at one of said focal points.

2. The apparatus of claim 1 in which said intersecting point is in said first path.

3. The apparatus of claim 2 in which said combining means comprises a beam splitter lens member.

4. The apparatus of claim 3 in which said means for splitting deflects said first light beam 90 degrees to said second light beam.

5. The apparatus of claim 1 in which said source of scanning light beams comprises a Helium Neon laser.

6. An optical scanning apparatus for reading bar code symbols on objects passing through different focal planes adjacent the scanning apparatus comprising:
    a support member;
    a cover number having an aperture therein through which scanning light beams are projected and over which a merchandise item bearing a coded label is moved across the aperture;
    a source of coherent light beams secured to said support member adjacent the top surface of said support member;
    first light reflecting means mounted on said support member for receiving said light beams and reflecting the light beams along a first light path;
    beam splitting means mounted on a said support member in said first light path for splitting the light beams into light beams transmitted along second and third light paths;
    focusing means mounted in said second and third light paths for focusing the light beams at different predetermined focal planes adjacent the aperture; and means secured to said support member for intercepting and combining the focused light beams in said second and third light paths for generating a light beam which is focused at a plurality of focal planes adjacent the aperture for reading bar code symbols positioned in said focal planes.

7. The optical scanning apparatus of claim 6 in which said intercepting and combining means includes second light reflecting means mounted on said support member and in said second light path for reflecting the light beam further along a fourth light path intercepting the third light path.

8. The optical scanning apparatus of claim 7 in which said intercepting and combining means further includes;

a second beam splitting means mounted on said support member and in said third light path at a position for receiving the light beam transmitted along said fourth light path for combining the second and third light beams to generate a combined light beam comprising said second and third light beams, said second beam splitting means projecting the combined light beam along a fifth light path;

scanning means mounted on said support member and positioned in said fifth light path for spectrally sweeping the combined light beam along a plurality of sixth light paths; and third reflecting means mounted on said support member and positioned in a said sixth light path for reflecting the light beam through said aperture in a cover member for scanning a bar code label positioned adjacent to the aperture.

9. The optical scanning apparatus of claim 8 in which said first and second beam splitting means and said light reflecting means deflect the light beams 90 degrees.

10. The optical scanning apparatus of claim 6 which further includes a detector means for converting received light beams into electrical signals and convex lens means mounted in said fifth light path for receiving and focusing the light beams reflected from the bar code symbols on said detector means.

11. The optical scanning apparatus of claim 6 in which said source of coherent light beams comprises a Helium Neon laser.

* * * * *

UNITED STATES PATENT AND TRADEMARK OFFICE
CERTIFICATE OF CORRECTION

PATENT NO. : 5,073,702

DATED : Dec. 17, 1991

INVENTOR(S) : Schuhmacher

It is certified that error appears in the above-identified patent and that said Letters Patent is hereby corrected as shown below:

Column 6, line 25, "beam" should be --beams--.

Signed and Sealed this

Thirteenth Day of April, 1993

*Attest:*

STEPHEN G. KUNIN

*Attesting Officer*     *Acting Commissioner of Patents and Trademarks*